United States Patent Office 3,419,563
Patented Dec. 31, 1968

3,419,563
PROCESS FOR PRODUCING 7-AMINO-
CARBOSTYRILE DERIVATIVES
Hans Knupfer, Bergisch Neukirchen, Wolf-Dieter Wirth, Cologne-Stammheim, and Carl-Wolfgang Schellhammer, Opladen, Germany, assignors to Farbenfabriken Bayer Aktiengesellschaft, Leverkusen, Germany, a corporation of Germany
No Drawing. Filed Apr. 5, 1966, Ser. No. 540,206
Claims priority, application Germany, Apr. 9, 1965, F 45,778
9 Claims. (Cl. 260—288)

ABSTRACT OF THE DISCLOSURE

7 - amino - carbostyriles and a process for producing 7 - amino - carbostyriles by reacting corresponding 2-amino - 4 - nitrotoluenes with alkaline polysulfide solution and heating.

---

The present invention relates to carbostyrile derivatives; more particularly it concerns new 7 - amino-carbostyrile derivatives and a process for producing the same. The process of the invention consists in that 2 - amino-4-nitro-toluenes of the formula

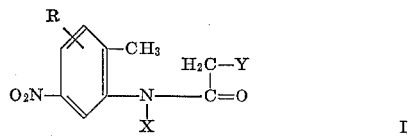

in which R and X, independently of one another, denote hydrogen or a lower alkyl group and Y stands for an aromatic or an aromatic-heterocyclic radical, are treated with alkaline polysulphide solutions. The new 7 - aminocarbostyriles so obtained correspond to the formula

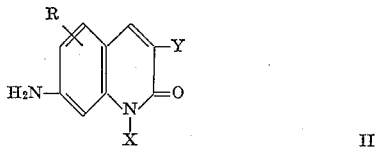

in which R, X and Y have the same meaning as above.

Aromatic or aromatic-heterocyclic radicals which are represented by Y are, for example, phenyl and naphthalene radicals or thienyl and pyridyl radicals. These radicals may also be substituted, for example, by alkyl groups, alkoxy groups, halogen atoms or phenyl radicals; nitro and carbalkoxy groups may also be present as substituents in the said radicals, but these groups are converted in the course of the process according to the invention into amino groups and carboxyl groups, respectively.

The acylated 2 - amino - 4 - nitro - toluenes of the Formula I serving as starting materials are known or they can be obtained from the 2 - amino - 4 - nitro - toluenes from which they are derived by reaction with suitable acid halides or anhydrides. To carry out the process according to the invention, they are expediently used in the form of solutions in organic solvents, preferably ethanol or dimethyl sulphoxide.

The 7 - amino - carbostyriles of the Formula II obtained according to the invention are valuable brightening agents; they can also serve for the production of dyestuffs.

The following examples serve to illustrate the invention without, however, limiting its scope; the parts given are parts by weight.

Example 1.—A solution of 13.6 parts 2 - (N - phenylacetyl - N - methylamino) - 4 - nitro - toluene in a mixture of 200 parts ethanol and 50 parts water is mixed dropwise at boiling temperature with a solution of 2.6 parts sulphur in 11 parts of a 40% sodium hydroxide solution, the mixture is further heated at boiling temperature for 6 hours, subsequently cooled and then mixed with 200 parts water. The resultant precipitate is filtered off and recrystallised from xylene. 6.6 parts 1-methyl - 3 - phenyl - 7 - amino - carbostyrile of melting point 187–190° C. are obtained.

Example 2.—A solution of 24 parts 2 - [N - (3',4'-dichlorophenyl-acetyl) - N - methylamino] - 4 - nitro-toluene in 320 parts ethanol is mixed dropwise with a solution of 6 parts $Na_2S \cdot 9H_2O$, 2.5 parts sulphur and 4.5 parts sodium hydroxide in 120 parts water, then heated at boiling temperature for 5 hours, filtered and mixed with 500 parts water. The resultant precipitate is filtered off and recrystallised from xylene. 14 parts 1 - methyl - 3-(3',4' - dichlorophenyl) - 7 - amino - carbostyrile of melting point 185–186° C. are obtained.

Example 3.—A reaction vessel containing a solution of 12 parts $Na_2S \cdot 9H_2O$, 5 parts sulphur and 13.5 parts sodium hydroxide in a mixture of 200 parts water and 160 parts ethanol is fitted with a hot stream extractor which contains 40 parts 2 - (N - phenylacetyl - N-methylamino) - 4 - nitro - toluene and then heated. The acetyl compound which is dissolved by the alcohol at boiling temperature, then drips into the polysulphide solution. When the extraction is completed, the reaction mixture is further heated at boiling temperature for 5 hours and subsequently cooled 21 parts 1 - methyl - 3 - phenyl-7-amino - carbostyrile of melting point 188–190° C. are precipitated.

The following compounds are obtained in an analogous manner:

23 parts 1 - ethyl - 3 - phenyl - 7 - amino - carbostyrile of melting point 167–170° C. from 42 parts 2-(phenyl-acetyl - N - ethylamino) - 4 - nitro - toluene;

27 parts 1 - methyl - 3 - (p - tolyl) - 7 - amino- carbostyrile of melting point 187–189° C. from 42 parts 2-[N-p-tolyl-acetyl)-N-methylamino] - 4 - nitro-toluene;

12.5 parts 1 - methyl - 3 - (p - tolyl) - 6 - methyl-7-amino-carbostyrile of melting point 265–268° C. from 44 parts 2 - [N - (p-tolyl-acetyl)-N-methylamino]-4-nitro-6-methyltoluene;

27.5 parts 1 - methyl - 3 - (p-tert.-butyl-phenyl)-7-amino-carbostyrile of melting point 247–249° C. from 47.5 parts 2 - [N - (p - tert. - butyl-phenyl-acetyl)-N-methylamino] - 4 - nitro - toluene;

27 parts 1 - methyl - 3 - (p-methoxyphenyl)-7-amino-carbostyrile of melting point 189–191° C. from 44 parts 2 - [N - (p - methoxyphenyl - acetyl)-N-methylamino]-4 - nitro - toluene;

30 parts 1 - ethyl-3-(p-chlorophenyl)-7-amino-carbostyrile of melting point 219–222° C. from 47 parts 2-[N - (p - chlorophenyl - acetyl)-N-ethylamino]-4-nitro-toluene;

30 parts 1 - ethyl - 3 - (m-chlorophenyl)-7-amino-carbostyrile of melting point 132–134° C. from 47 parts 2 - [N - (m - chlorophenyl - acetyl) - N-ethylamino]-4-nitro-toluene;

29 parts 1 - methyl-3-(p-diphenyl)-amino-carbostyrile of melting point 249–250° C. from 51 parts 2 - [N-(p-diphenyl - acetyl) - N - methylamino] - 4 - nitro-toluene;

21 parts 1 - methyl - 3 - (2' - thienyl) - 7 - amino-carbostyrile of melting point 200–202° C. from 40 parts 2-[N-(2' - thienyl - acetyl) - N-methylamino]-4-nitro-toluene.

Example 4.—A solution of 12 parts $Na_2S \cdot 9H_2O$, 5 parts sulphur and 9 parts sodium hydroxide in a mixture of 50 parts water and 50 parts dimethyl sulphoxide is mixed dropwise at 80° C., while stirring, with a solution of 44 parts 2 - (N - p - tolyl-acetyl - N - methylamino)-4-nitro - toluene in 50 parts dimethyl sulphoxide, kept at 80° C. for 4 hours and then mixed with 200 parts water. The resultant precipitate is filtered off and recrystallised from xylene. 21 parts 1 - methyl-3-(p-tolyl)-7-amino - carbostyrile of melting point 184–187° C. are obtained.

Example 5.—A suspension of 38 parts 2 - (N-phenylacetylamino) - 4 - nitro - toluene in 640 parts ethanol is mixed dropwise with a solution of 12 parts $Na_2S \cdot 9H_2O$, 5 parts sulphur and 135 parts sodium hydroxide in 240 parts water, heated at boiling temperature for 5 hours and then mixed with 4000 parts water. The resultant precipitate is filtered off and recrystallised from 125 parts nitrobenzene. 21 parts 3 - phenyl - 7 - amino-carbostyrile of melting point 257–259° C. are obtained.

In an analogous manner, 21.5 parts 3-p-tolyl-7-amino-carbostyrile of melting point 266–269° C. are obtained from 40 parts 2 - [N - (p-tolyl-acetyl)-amino]-4-nitrotoluene.

We claim:
1. A compound of the formula

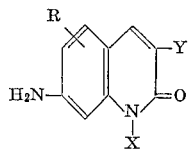

in which R and X are independently defined as hydrogen or lower alkyl; and Y is thienyl or substituted thienyl having as substituents a member selected from the group consisting of alkyl, alkoxy, halo, phenyl, amino and carboxyl.

2. The compound of claim 1 wherein X is a member selected from the group consisting of hydrogen, methyl and ethyl.

3. A process for producing 7-amino-carbostyriles comprising contacting a reactant of the formula

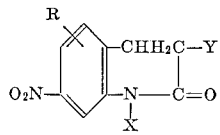

in which R and X are independently defined as hydrogen or lower alkyl; and Y is a member selected from the group consisting of a phenyl, naphthyl, thienyl and pyridyl moiety, with an alkaline polysulphide solution; heating; and recovering the resulting carbostyrile product.

4. The process of claim 3 wherein Y is a member selected from the group consisting of phenyl, chlorophenyl, dichlorophenyl, lower alkyl phenyl, lower alkoxy phenyl, diphenyl, and thienyl.

5. The process of claim 3 wherein the toluene reactant is dissolved in an organic solvent.

6. The process of claim 4 wherein the toluene reactant is dissolved in a member selected from the group consisting of ethanol and dimethyl sulphoxide.

7. The process of claim 5 wherein about 14 parts of 2 - (N - phenylacetyl - N - methylamino) - 4 - nitro toluene is dissolved in an ethanol-water solvent, mixing at boiling temperature with a solution of about 3 parts of sulfur and 40% hydroxide, heating the reaction mixture and recovering the resulting carbostyrile product.

8. The process of claim 5 wherein about 24 parts of 2 - [N - (3',4' - dichlorophenyl - acetyl) - N - methylamino] - 4 - nitrotoluene is dissolved in ethanol, admixing with about 6 parts of hydrated sodium sulfide, about 3 parts sulfur and about 5 parts sodium hydroxide in about 120 parts water, heating the reaction mixture and recovering the resulting carbostyrile product.

9. The process of claim 6 wherein about 40 parts of 2 - (N - phenylacetyl - N - methylamino) - 4 - nitrotoluene is admixed with a solution containing about 12 parts hydrated sodium sulfide, 5 parts of sulfur and 14 parts of sodium hydroxide in about 200 parts of water and 160 parts of ethanol, heating the reaction mixture and recovering the resulting carbostyrile product.

References Cited
UNITED STATES PATENTS

| | | | |
|---|---|---|---|
| 2,781,345 | 2/1957 | Leavitt et al. | 260—288 |
| 2,901,485 | 8/1959 | Brody et al. | 260—288 |
| 3,178,434 | 4/1965 | Pfister et al. | 260—288 |

NICHOLAS S. RIZZO, *Primary Examiner.*

DONALD G. DAUS, *Assistant Examiner.*

U.S. Cl. X.R.

252—301.2; 260—577, 578, 329, 295, 558, 562